United States Patent [19]

Leahy

[11] Patent Number: 5,026,108

[45] Date of Patent: Jun. 25, 1991

[54] SLIDING AND PIVOTING SUN VISOR

[75] Inventor: Charles E. Leahy, Grosse Pointe Farms, Mich.

[73] Assignee: General Motors Corporation, Detroit, Mich.

[21] Appl. No.: 524,531

[22] Filed: May 17, 1990

[51] Int. Cl.$^5$ ............................................... B60J 3/02
[52] U.S. Cl. ................................................. 296/97.11
[58] Field of Search .................. 296/97.1, 97.9, 97.11, 296/97.12

[56] References Cited

U.S. PATENT DOCUMENTS

| | | | |
|---|---|---|---|
| 2,223,845 | 12/1940 | Davies | 296/97.11 |
| 2,299,775 | 10/1942 | Westrope | 296/97.11 |
| 2,458,707 | 1/1949 | Jacobs | 296/97.11 |
| 2,802,693 | 8/1957 | Lauve | 296/97.12 |
| 3,032,371 | 5/1962 | Berridge et al. | 296/97.11 |
| 4,902,063 | 2/1990 | Crink | 296/97.11 |

FOREIGN PATENT DOCUMENTS 2491403  4/1982  France .............................. 296/97.12

Primary Examiner—Margaret A. Focarino
Assistant Examiner—Joseph D. Pape
Attorney, Agent, or Firm—Raymond I. Bruttomesso, Jr.

[57] ABSTRACT

A sunshade panel is mounted on a support rod by an improved bearing assembly which permits the sunshade to pivot about the rod and to slide axially along the rod. The bearing assembly includes the support rod with a splined shaft and a sunshade carrier which encircles the support rod in radially spaced relation from the support rod. The sunshade panel is mounted on the sunshade carrier. A low friction slide element is interposed in the space between the carrier and the support rod. The slide element is preferably a VELCRO-like material including a base of plastic or fabric and a plurality of radially projecting resiliently flexible friction fingers which project to fill the radial space and enable sliding movement of the sunshade panel relative to the support rod by virtue of the frictional slip and resilient flexure of the fingers. Rotating movement of the carrier relative to the rod is permitted by flexing and compression of the resilient fingers relative to the splined shaft to adjust the rotary position of the sun visor. The fingers of the slide element readily accommodate dimensional irregularities between the shape of the carrier and the support rod.

3 Claims, 1 Drawing Sheet

SLIDING AND PIVOTING SUN VISOR

The invention relates to an automobile sun visor and, more particularly, a sun visor which both pivots and slides along a support rod.

BACKGROUND OF THE INVENTION

It is known in vehicle body sunshades to mount a sunshade panel on a support rod which is pivotally mounted on the vehicle body. This sunshade panel is pivotal on the rod so that the sun visor can be moved between a stored position against the headliner or pivoted down to shield the driver's eyes from incoming sunlight. It is also known to provide such a sunshade which slides axially along the support rod so that the sunshade may be better positioned to block the sunlight.

Prior art sunshades have employed somewhat complex bearing devices to permit the sunshade to both rotate about the rod and slide axially along the rod.

It is also known to provide a sunshade with a simple bearing assembly of a sleeve of stamped sheet metal that works in combination with a low friction slide element as disclosed in Crink Serial No. 07/272,693 filed on Nov. 18, 1988.

The present invention provides a new and improved sliding sunshade of economical manufacture.

SUMMARY OF THE INVENTION

According to the invention, the sunshade panel is mounted on a support rod by an improved bearing assembly which permits the sunshade to pivot about the rod and to slide axially along the rod. The bearing assembly includes a splined shaft of the support rod and a sunshade carrier which encircles the support rod in radially spaced relation from the support rod. The sunshade panel is mounted on the sunshade carrier. A low friction slide element, part of the bearing assembly, is interposed in the radial space between the carrier and the support rod. The slide element is preferably a VELCRO-like material including a base of plastic or fabric and having a plurality of radially projecting resiliently flexible friction fingers which project to fill the radial space and enable sliding movement of the sunshade panel relative to the support rod by virtue of the frictional slip and resilient flexure of the fingers. Rotating movement of the carrier relative to the rod is permitted by flexing and compression of the resilient fingers relative to the splined shaft to adjust the radial position of the sun visor. The fingers of the slide element readily accommodate dimensional irregularities between the shape of the carrier and the support rod.

One object, feature and advantage of this invention is a slide element, preferably VELCRO loop-type material, that fills a radial space between a sunshade carrier and a support rod and allows for dimensional irregularities of the carrier and the support rod.

Another object, feature and advantage of this invention resides in a plurality of radially projecting resiliently flexible friction fingers carried by a sunshade and engaging with a splined support rod to allow free axial sliding movement of the sunshade along the rod and detented rotational movement of the sunshade relative to the support rod.

Further objects, features and advantages of the present invention will become apparent to those skilled in the art as the nature of the invention is better understood from the accompanying drawings and detailed description.

BRIEF DESCRIPTION OF THE DRAWINGS

These and other objects, features and advantages of the invention will become apparent upon consideration of the description of the preferred embodiment and the appended drawings in which.

DESCRIPTION OF THE PREFERRED EMBODIMENT

Figure 1:
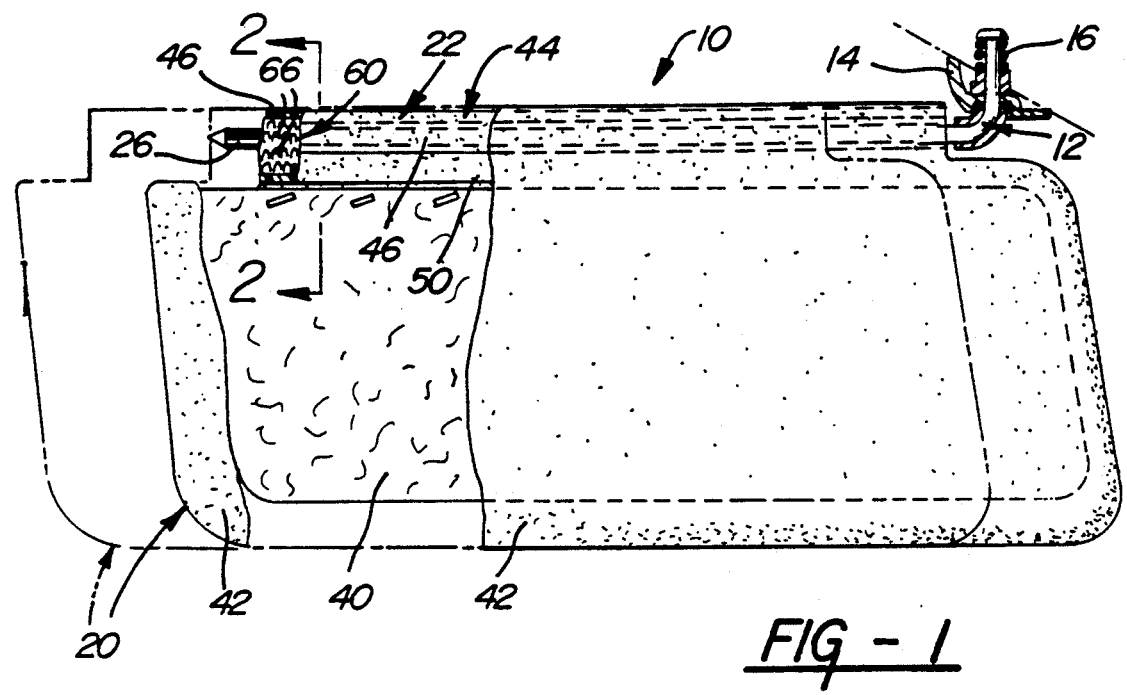
FIG. 1 is an elevation view of the sun visor mounted in a vehicle body.

Referring to FIG. 1, it is seen that the sun visor generally indicated at 10 includes a support rod 12 which is mounted on a vehicle body roof by a mounting escutcheon 14 and spring 16 in a manner by which the rod 12 may be pivoted relative to the vehicle body. The sun visor 10 also includes a sunshade panel 20 which is mounted on the rod 12 by a bearing assembly, generally indicated at 22, which enables the sunshade panel 20 to both rotate about the rod 12 and to slide along the rod 12 between the solid line indicated position of FIG. 1 and the phantom line indicated position of FIG. 1.

Figure 2:
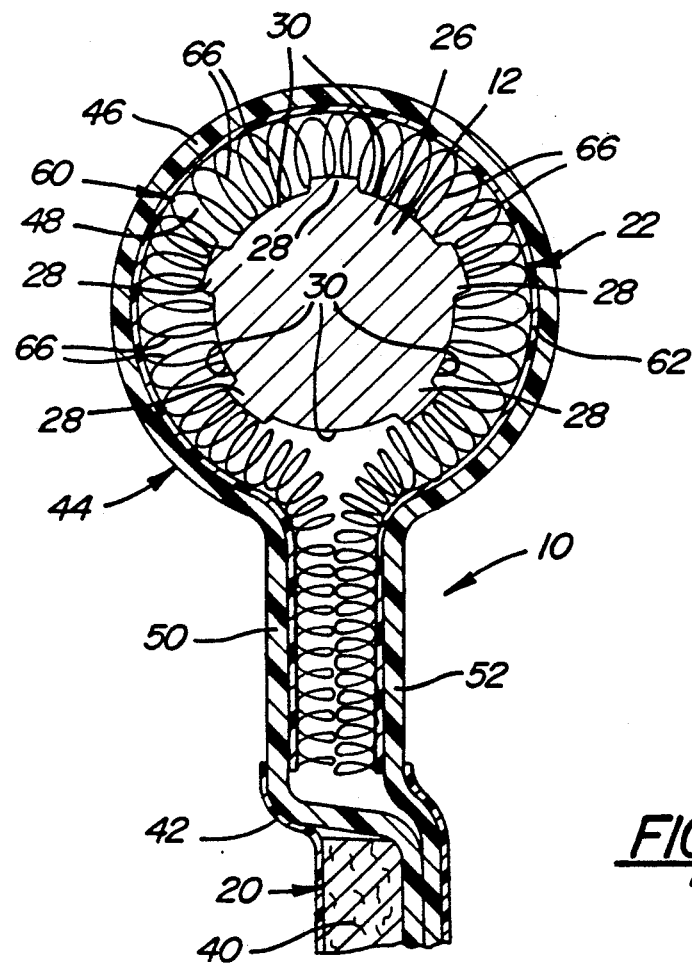
FIG. 2 is a sectional view taken in the direction of arrows 2—2 of FIG. 1.

Referring to FIG. 2, it is seen that the support rod 12 has a splined shaft 26 which defines alternating teeth 28 and notches 30 which extend axially along the support rod 12.

As best seen in FIG. 2, the sunshade panel 20 includes a foundation board 40 covered with vinyl sheeting 42. The foundation board 40 is connected to the support rod 12 by a molded or extruded plastic carrier 44. The carrier 44 has a tubular portion 46 which is larger in diameter than the support rod 12 so that a radial spacing 48 is defined between the support rod 12 and the tubular portion 46 of the carrier 44. The carrier 44 also has legs 50 and 52 which extend parallel from the tubular portion 46. The terminal ends of the legs 50 and 52 are stapled or otherwise suitably attached to the foundation board 40.

Referring again to FIG. 2, it is seen that the bearing assembly 22 includes a low friction slide element 60 interposed in the radial space 48 between the carrier 44 and the splined shaft 26 of the support rod 12. The slide element 60 is preferably a VELCRO loop-type material including a plastic base 62 having a plurality of fingers 66 projecting therefrom. The fingers 66 may be a looped thread, as shown in FIG. 2, or a plurality of independently molded plastic projections. In either case, the fingers 66 are of sufficient length to fill the radial space 48 between the tubular portion 46 of the carrier 44 and the support rod 12 including the notches 30 formed by the splined shaft 26. The base 62 of the slide element 60 is attached to the sleeve portion 46 of the carrier 24 by a suitable adhesive.

The fingers 66 located in the notches 30 of the splined shaft 26 resist flexing and compressing under the weight of the sunshade panel 20 so that the sunshade panel 20 will normally remain stationary against rotation about the splined shaft 26.

In order to rotate the sunshade panel 20, a force must be exerted on the sunshade panel 20 rotating the plastic carrier 44 and the plastic base 62 relative to the support rod 12. The fingers 66 flex allowing the fingers 66 aligned with the notches 30 to compress and bend to pass over the teeth 28. The fingers 66 that were aligned with the teeth 28 resiliently flex back to fill the notches 30 so that when the force is terminated the sunshade panel 20 is retained in the new position.

As best seen in FIG. 1, the sunshade panel 20 may be shifted left and right by sliding the panel along the length of the rod 12 as permitted by the bearing assembly 22. In particular, referring to FIG. 2, it is understood that this sliding action is permitted by the frictional sliding of the carrier 44 along the support rod 12. The fingers 66 flex and frictionally slip along the support rod 12 as necessary to permit the sliding movement of the sunshade panel 20.

The "feel" of the sliding and rotation of the sunshade is determined by controlling the stiffness and material of the fingers 66 and the number and size of the teeth 28 and notches 30 of the splined shaft 26. In addition, it will be understood that the fingers 66 will forgive dimensional variations in the spacing between the sleeve assembly 26 and the carrier 44. Accordingly, the manufacturing processes employed to mold the support rod 12 and to form the plastic carrier 44 need not be as closely controlled as in prior art bearing assemblies where plastic and metal parts are precisely formed in shape to provide the desired compromise between ease of sliding and rotating movement and resistance to sliding and rotating movement.

While the preferred embodiment shown in the drawings employs a VELCRO-type material of the type having loops, it will be appreciated that VELCRO-type hook fasteners may also be employed. Alternatively, rather than VELCRO-type material, any construction having a base and radially projecting fingers may be employed.

Thus, it is seen that the invention provides a new and improved sliding sunshade for a motor vehicle in which the bearing assembly enabling sliding movement of the sunshade is provided by plurality of resilient fingers extending radially between the rod and sunshade.

The embodiments of the invention in which an exclusive property or privilege is claimed are defined as follows:

1. A vehicle sun visor comprising:
   a rod mounted on the vehicle body and having a splined shaft;
   a sunshade panel;
   a carrier encircling the rod in radially spaced relation therefrom and having the sunshade panel mounted thereon; and
   a low friction slide element interposed in the space between the carrier and the rod, the slide element including a base attached to the carrier and a plurality of radially projecting resilient fingers projecting into frictional engagement with the splined shaft of the rod so that slideable and rotational movement of the carrier relative to the rod is permitted by the compression and the frictional slip of the resilient fingers to adjust the position of the sun visor.

2. A vehicle sun visor comprising:
   a rod mounted on the vehicle body and having a splined shaft defining a series of teeth and notches;
   a sunshade panel;
   a carrier encircling the rod in radially spaced relation therefrom and having the sunshade panel mounted thereon; and
   a low friction slide element interposed in the space between the carrier and the rod, the slide element including a base attached to the carrier and a plurality of radially projecting resilient fingers projecting into frictional engagement with the splined shaft of the rod at both the teeth and the notches so that sliding movement of the carrier relative to the rod is permitted by the frictional slip of the resilient fingers to adjust the axial position of the sun visor and rotating movement of the carrier relative to the rod is permitted by flexing and compression of the resilient fingers relative to the splined shaft to adjust the radial position of the sun visor.

3. A vehicle sun visor comprising:
   a rod mounted on the vehicle body and having a splined shaft defining a series of teeth and notches;
   a sunshade panel;
   a carrier encircling the rod in radially spaced relation therefrom and having the sunshade panel mounted thereon; and
   a VELCRO loop-type material interposed in the space between the carrier and the rod, the loop-type material including a base attached to the carrier and a plurality of radially projecting resilient fingers projecting into frictional engagement with the splined shaft of the rod to fill the radial space between the carrier and the rod including the notches formed by the splined shaft so that sliding movement of the carrier relative to the rod is permitted by the frictional slip of the resilient fingers to adjust the axial position of the sun visor and rotating movement of the carrier relative to the rod is permitted by flexing and compression of the resilient fingers relative to the splined shaft to adjust the radial position of the sun visor.

* * * * *